United States Patent [19]

Fisli

[11] Patent Number: 5,691,761
[45] Date of Patent: Nov. 25, 1997

[54] METHOD AND APPARATUS FOR MULTI-CHANNEL PRINTING IN A RASTER OUTPUT SCANNING SYSTEM

[75] Inventor: Tibor Fisli, Los Altos Hills, Calif.

[73] Assignee: Xerox Corporation, Stamford, Conn.

[21] Appl. No.: 352,766

[22] Filed: Dec. 2, 1994

[51] Int. Cl.⁶ .......................... B41J 2/47; G01D 15/14; G02B 26/00; G02B 27/00
[52] U.S. Cl. .................. 347/241; 347/243; 347/259; 347/261
[58] Field of Search ..................... 347/134, 241, 347/243, 256, 258, 259, 260, 261

[56] References Cited

U.S. PATENT DOCUMENTS

| | | | |
|---|---|---|---|
| 4,474,422 | 10/1984 | Kutamura | 359/204 |
| 4,578,688 | 3/1986 | Okuno | 347/118 |
| 4,591,903 | 5/1986 | Kawamura et al. | 347/243 |
| 4,761,046 | 8/1988 | Funato | 347/118 |
| 4,847,642 | 7/1989 | Murayama et al. | 347/116 |
| 4,903,067 | 2/1990 | Murayama et al. | 347/129 |
| 5,166,704 | 11/1992 | Yasuda | 347/248 |
| 5,233,367 | 8/1993 | Curry | 347/243 |
| 5,243,359 | 9/1993 | Fisli | 347/134 |
| 5,402,436 | 3/1995 | Paoli | 347/238 |

*Primary Examiner*—Mark J. Reinhart
*Assistant Examiner*—L. Anderson
*Attorney, Agent, or Firm*—Oliff & Berridge

[57] ABSTRACT

In a raster output scanning system (ROS) of a xerographic printing device, a plurality of input optical channels direct at least one of a plurality of light beams onto separate facets of a deflector, which may be a rotating polygon mirror. The deflector deflects the light beams onto disparate optical paths. An optical system located on the disparate optical paths directs at least one of the light beams onto each of first, second, third and fourth image receiving locations. The image receiving locations may comprise a plurality of photoreceptors.

26 Claims, 6 Drawing Sheets

METHOD AND APPARATUS FOR MULTI-CHANNEL PRINTING IN A RASTER OUTPUT SCANNING SYSTEM

FIELD OF THE INVENTION

The present invention relates to xerographic printing devices utilizing a raster output scanner to generate scanning light beams, and in particular to such printing devices that utilize a plurality of input optical channels.

BACKGROUND OF THE INVENTION

Flying spot scanners, often referred to as raster output scanners (ROS), conventionally have a reflective multi-faceted polygon mirror that is rotated about its central axis to repeatedly sweep one or more intensity modulated beams of light across a photosensitive recording medium in a line scanning direction (also known as the fast-scan direction) while the recording medium is being advanced in an orthogonal, or process, direction (also known as the slow-scan direction) such that the beams scan the recording medium in accordance with a raster scanning pattern. Digital printing is performed by serially intensity modulating each of the beams in accordance with a binary sample string, whereby the recording medium is exposed to the image represented by the samples as it is being scanned. Printers that sweep several beams simultaneously are referred to as multi-beam printers. Both ROS and multi-beam printer techniques are illustrated in U.S. Pat. No. 4,474,422 to Kitamura, the disclosure of which is incorporated herein by reference.

In the Kitamura patent, multiple lasers are arranged diagonally to sweep multiple beams across a single photoreceptor. The beams are also displaced from each other in the cross-scan direction so that multiple lines can be scanned simultaneously across the photoreceptor. An object of the Kitamura patent is to reduce variations in pitch by spacing individual lasers within the laser array closely in a compact structure.

High speed process color and multi-highlight color xerographic image output terminals often require multiple independently addressable raster lines to be printed simultaneously at separate locations. This is called multi-station printing.

Conventional architectures from multi-station process color printers use a plurality of separate ROSs, usually four independent ROSs, with four independent polygons, as illustrated in U.S. Pat. Nos. 4,847,642 and 4,903,067 to Murayama et al., the disclosures of which are incorporated herein by reference. Problems with these systems include the high cost of providing multiple, nearly identical ROSs and the difficulty of registering system colors.

U.S. Pat. No. 5,233,367 discloses an image forming apparatus and method for interlace scanning plural light beams by deflecting the plural light beams with a rotating polygon. The spacing between adjacent beams on the recording medium is defined by an interlace factor and may be adjusted to a desired interlace factor.

U.S. Pat. No. 5,243,359 to Fisli, the disclosure of which is incorporated herein by reference, discloses a ROS system suitable for deflecting multiple laser beams in a multi-station printer. In the Fisli patent, the rotating polygon mirror simultaneously deflects a plurality of clustered, dissimilar wavelength laser beams having their largest divergence angles parallel to one another. The beams are subsequently separated by a plurality of optical filters and directed onto associated photoreceptors. Similarly dimensioned spots are obtained on each photoreceptor by establishing similar path lengths for each beam. This is facilitated by locating all lasers in one integral unit. The laser diodes are arranged in a line in a cross-scan direction, i.e., parallel to the axis of rotation of the polygon mirror.

U.S. Pat. No. 4,761,046 to Funato, the disclosure of which is incorporated herein by references, discloses a method of recording a color image on a recording medium by applying a plurality of laser beam signals simultaneously to a plurality of photosensitive bodies to form latent images thereon. The method of Funato applies the modulated laser beams to a hologram disk having a circular transparent substrate in a plurality of optically equivalent hologram gradings. The hologram disk rotates to deflect the laser beam via optics onto the photosensitive bodies. Problems with the Funato method include the high cost of producing the hologram and the difficulty of properly registering system colors.

U.S. Pat. No. 4,578,688 to Okuno, the disclosure of which is incorporated herein by reference, discloses a light beam printer which directs first and second light beams onto separate facets of a rotating polygon mirror. The rotating polygon mirror directs a first beam and a second beam through separate optics onto first and second photosensitive means, respectively. The first and second laser beams each correspond to a separate color image signal and thus form images on the first and second photosensitive mediums, each of a different color. The images are then transferred onto a transfer medium in superposed relationship with each other to form a two color image. The system of Okuno is thus only capable of forming a two color image in a single pass of the transfer medium by the photosensitive mediums.

U.S. Pat. No. 4,591,903 to Kawamura et al., the disclosure of which is incorporated herein by reference, discloses a recording apparatus which scans four laser beams onto four separate photoreceptors. The apparatus uses two separate rotating polygon mirrors to deflect the beams. Two laser beams are directed to separate facets of each of the two rotating polygons, which deflect the laser beams through optics onto the separate photoreceptors. The laser beams scan images of one of four separate colors onto each of the photosensitive drums. The apparatus then transfers the images to a recording sheet. The apparatus of Kawamura et al. is thus capable of producing a four color image with a single pass of the recording sheet past the photosensitive drums. Problems with this apparatus includes the high cost of providing multiple, nearly identical ROSs with multiple rotating polygon mirrors and the difficulty of registering system colors.

SUMMARY OF THE INVENTION

It is therefore an object of embodiments of this invention to provide a multiple light beam ROS system that provides one pass four color printing utilizing a single rotating polygon deflector.

It is a further object of embodiments of this invention to provide such a multiple light beam ROS system that utilizes multiple input optical channels.

It is a further object of embodiments of this invention to provide such a multiple light beam ROS system that utilizes multiple output optical channels.

It is a further object of embodiments of this invention to provide such a multiple light beam ROS system that directs multiple light beams to each of a plurality of image receiving locations.

In order to realize this and other objects, and to overcome the shortcomings set forth above, a raster output scanner for a printing device includes a deflector having a plurality of facets, a plurality of input optical channels, each of the input optical channels directing at least one of a plurality of light beams onto separate facets of the deflector, the deflector deflecting the light beams onto disparate optical paths and an optical system located on the disparate optical paths, the optical system directing at least one of the light beams onto each of first, second, third and fourth image receiving locations. The deflector may be a polygon mirror mounted for rotation about a central horizontal axis. In a preferred embodiment, the image receiving locations are disposed on first, second, third and fourth photoreceptors.

BRIEF DESCRIPTION OF THE DRAWINGS

The above and further objects and advantages of the present invention will become clearer from the following description of preferred embodiments taken in conjunction with the following drawings, in which like reference numerals refer to like elements, and wherein:

FIG. 1b is a simplified top view illustrating the raster output scanning system of FIG. 1a;

FIG. 2b is a simplified, schematic top view of the raster output scanning system of FIG. 2a;

FIG. 3b is a simplified, schematic top view of the raster output scanning system of FIG. 3a;

FIG. 4b is a simplified, schematic top view of the raster output scanning system of FIG. 4a;

FIG. 5b is a simplified, schematic top view of the raster output scanning system of FIG. 5a;

FIG. 6b is a simplified, schematic top view of the raster output scanning system of FIG. 6a.

DETAILED DESCRIPTION OF PREFERRED EMBODIMENTS

While this invention is described in detail herein, with specific reference to certain illustrated embodiments, it is to be understood that there is no intent to be limited to those embodiments. On the contrary, the aim is to cover all modifications, alternatives and equivalents falling within the spirit and scope of the invention.

For example, embodiments of the invention are applicable to all types of printing devices. Such printing devices include facsimile machines, copiers, printers, etc. The illustrated embodiments direct each light beam to separate image receiving locations that are located on separate photoconductive drums. However, embodiments of the invention are also applicable to printing devices that use a single image receiving location such as an endless belt to receive multiple scanned light beams.

Figure 1A:
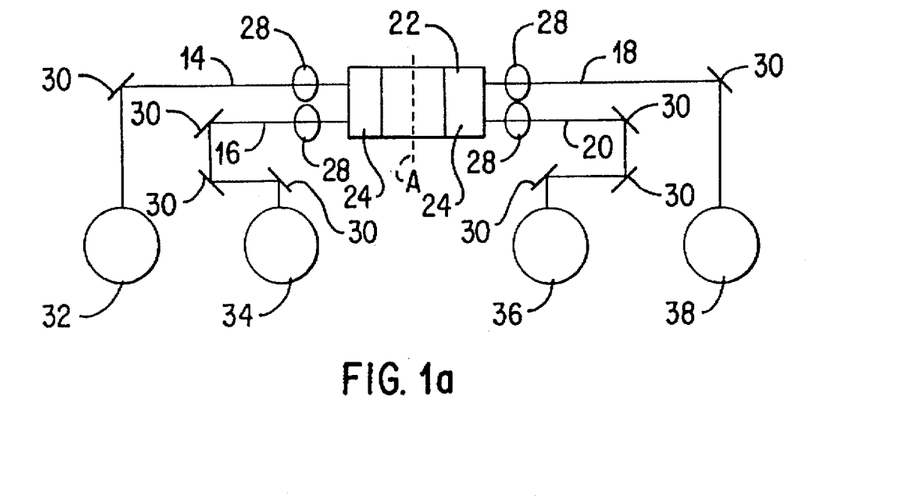
FIG. 1a is a simplified, schematic side view of a raster output scanning system that is usable with embodiments of the present invention.
Figure 1B:
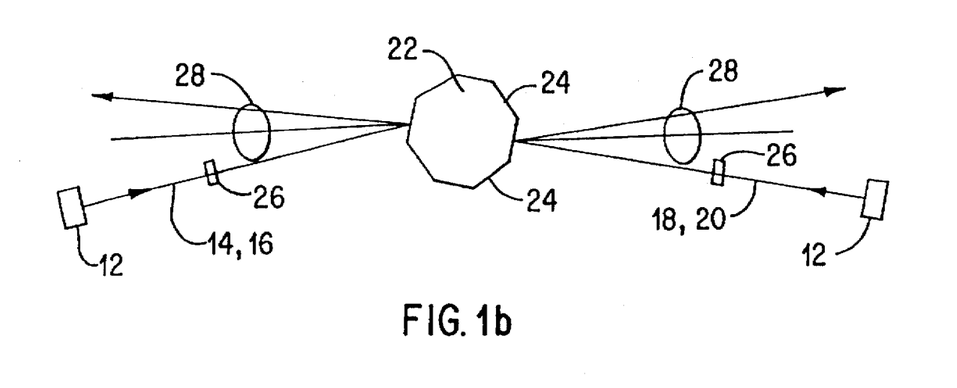

As illustrated in FIGS. 1a and 1b, an embodiment of the invention has a plurality of light source devices 12 that output four separate light beams 14, 16, 18 and 20. While it appears that there only two light source devices 12 in FIG. 1b there are actually four such light source devices 12, which are sagittally displaced (displaced parallel to the axis of rotation A of polygon 22). Thus, only two of the four light source devices 12 are visible in FIG. 1b. Similarly, the light beams 14 and 16 and the light beams 18 and 20 are sagittally displaced and thus appear as a single light beam in FIG. 1b.

Each of the light beams 14, 16, 18 and 20 are directed through separate input optics 26, which direct the beams 14, 16, 18 and 20 to the rotating polygon 22. Thus, in this embodiment, four separate input optical channels direct each of the light beams 14, 16, 18 and 20 to appropriate facets 24 of the polygon 22. Each of the input optical channels includes at least one light beam which passes through a single input optics 26. Thus, the raster output scanning system of the embodiment shown in FIGS. 1a and 1b has four input optical channels which are sagittally separated.

The light beams 14, 16, 18 and 20 are deflected by the rotating polygon 22 through imaging and correction optics (e.g., including an Fθ scan lens) 28, which focuses the beams and corrects for errors such as polygon angle error and wobble. Each of the light beams 14, 16, 18 and 20 are then reflected by mirrors 30 and are scanned across image receiving locations 32, 34, 36 and 38 to form images on the image receiving locations. The mirrors 30 are positioned to equalize an optical path length of each of the light beams 14, 16, 18 and 20. An optical output channel includes at least one light beam and a single imaging and correction optics 28. Thus, the system shown in FIGS. 1a and 1b has four output optical channels with one of the light beams 14, 16, 18 and 20 output through each of the output optical channels. Each of the light beams 14, 16, 18 and 20 when scanned across image receiving locations 32, 34, 36 and 38 forms an image of one plurality of different colors. Each of the images is transferred from the image receiving locations 32, 34, 36, and 38 onto a transfer medium (not shown) such as a sheet of paper, to form a color image thereon. Thus, the ROS system of the invention produces a four color image utilizing a plurality of input optical channels that direct light beams to separate facets of a rotating polygon with a single pass of the recording medium past the image receiving locations.

Figure 2A:
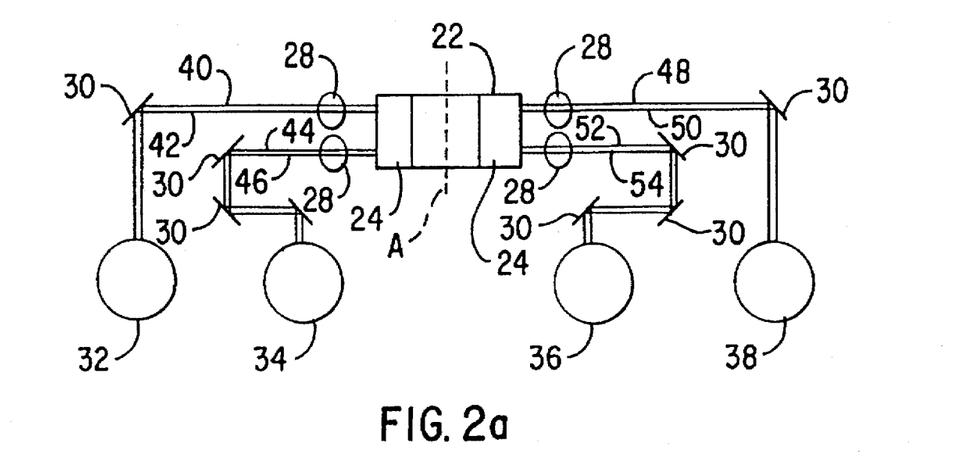
FIG. 2a is a simplified, schematic side view of a raster output scanning system that is usable with embodiments of the present invention.
Figure 2B:
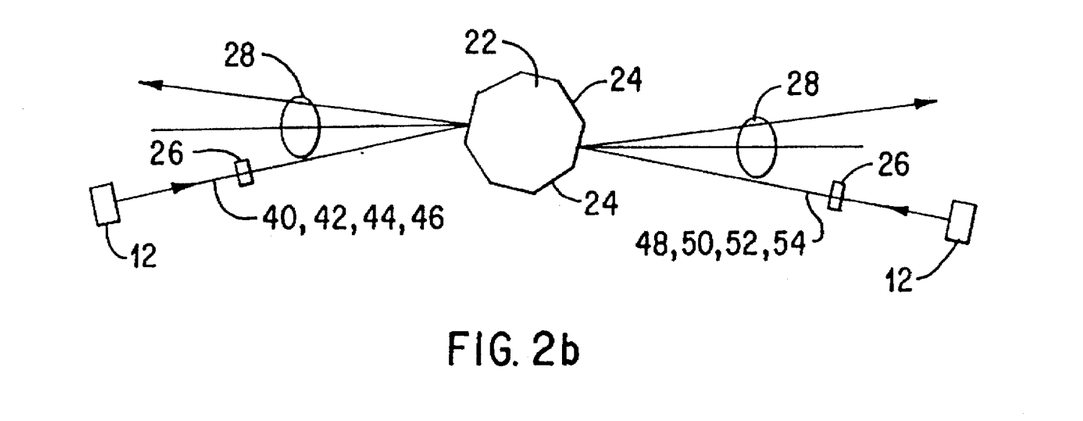

The ROS system shown in FIGS. 2a and 2b is similar to the one shown in FIGS. 1a and 1b except that the system uses eight light beams 40, 42, 44, 46, 48, 50, 52 and 54. Like the ROS system shown in FIGS. 1a and 1b, the ROS system shown in FIGS. 2a and 2b has four input optical channels and four output optical channels. However, the ROS system shown in FIGS. 2a and 2b has two light beams directed by each of the input optical channels to the rotating polygon 22. Each of the output optical channels directs two of the light beams onto one of the image receiving locations 32, 34, 36 and 38. By utilizing two light beams per optical channel (input and output), the ROS system of this embodiment produces greater throughput than the ROS system illustrated in FIGS. 1a and 1b. The ROS system of FIGS. 2a and 2b could alternatively operate with more than two beams per optical channel to further increase throughput of the ROS system.

The ROS system of FIGS. 2a and 2b directs two (or more) beams to each of the image receiving locations 32, 34, 36 and 38. The beams directed to each of the image receiving locations 32, 34, 36 and 38 are sagitally separated and are either in pitch with each other or, alternatively, may be interlaced, as described in U.S. Pat. No. 5,233,367 to Curry, the disclosure of which has previously been incorporated by reference.

Figure 3A:
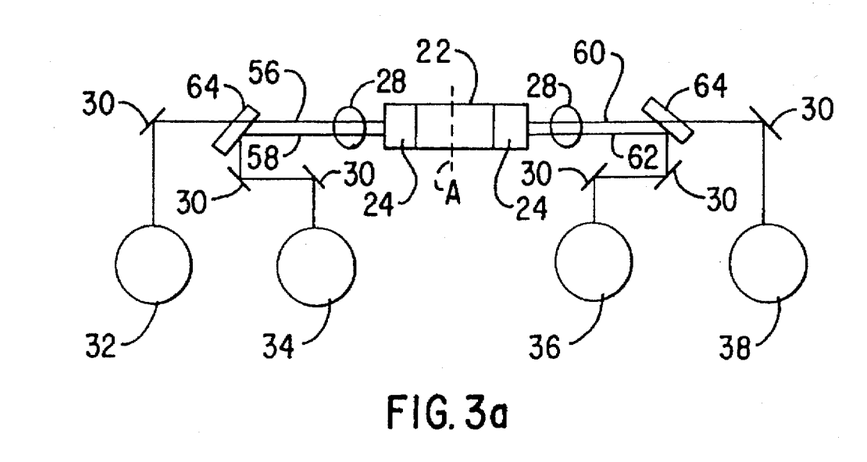
FIG. 3a is a simplified, schematic top view of a raster output scanning system that is usable with embodiments of the present invention.
Figure 3B:
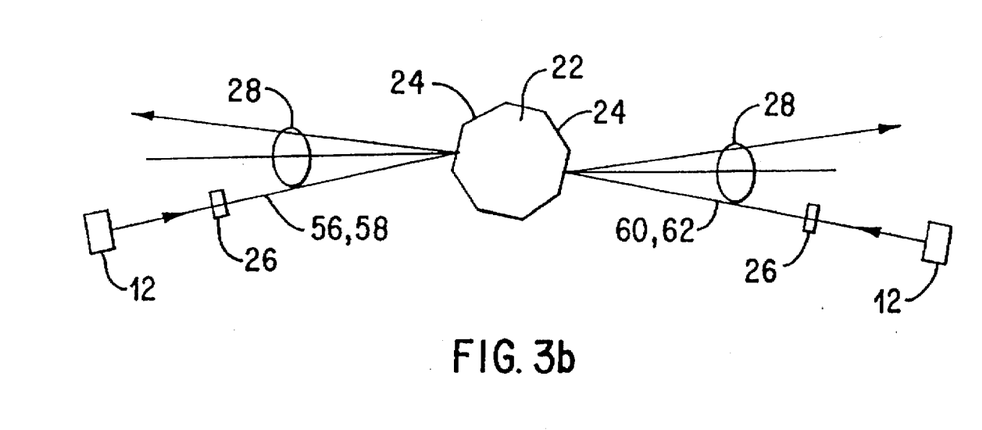

The ROS scanning system shown in FIGS. 3a and 3b is similar to the ROS scanning system shown in FIGS. 1a through 2b except that the ROS scanning system shown in FIGS. 3a and 3b includes two input optical channels and two output optical channels. Thus, in this embodiment, each of the light source devices 12 outputs two of the four light beams 56, 58, 60 and 62. In this embodiment, the light beams output from each of the light source devices 12 are sagittally separated. Additionally, the light beams output from each of the light source devices have either a different wavelength from each other or a different polarization from each other. Because this embodiment has only two optical output channels, the light beams on each optical output channel are closely spaced. The light beams 56 and 58 and the light beams 60 and 62 are directed to the optical separators 64. The optical separators 64 can be dichroic mirrors, (e.g., colorselective beam splitters) comprised of a wavelength selective, multilayer film, where the beams have different wavelengths, or alternatively, the optical separators 64 may be polarized beam separators which can be, for example, prisms or devices having a polarization selective multiple layer film. Similar to the previously described embodiments, the embodiment illustrated in FIGS. 3a and 3b utilizes a plurality of input optical channels to direct light beams to separate facets of a single rotating polygon to produce a four-color image in a single pass of an imaging medium past the image receiving locations 32, 34, 36 and 38.

Figure 4A:
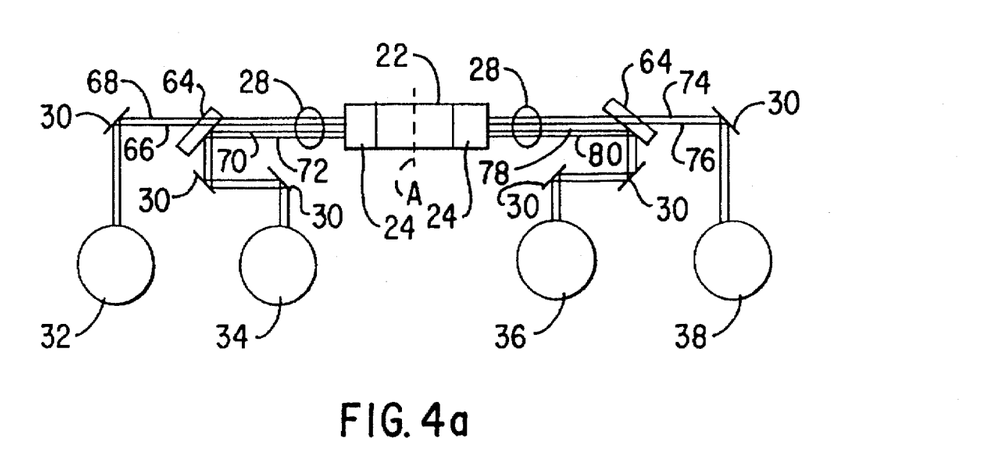
FIG. 4a is a simplified, schematic view of a raster output scanning system that is usable with embodiments of the present invention.
Figure 4B:
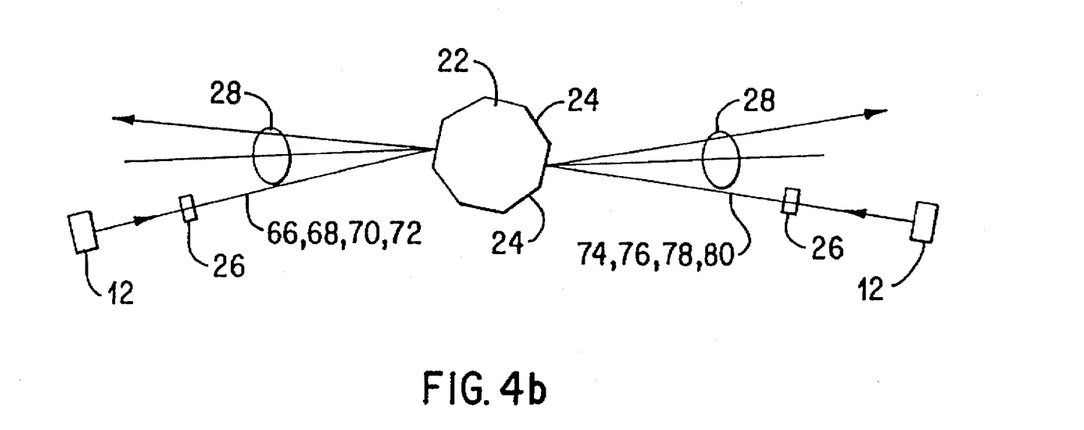

The ROS scanning system illustrated in FIGS. 4a and 4b is similar to the ROS scanning system illustrated in FIGS. 3a and 3b except that the ROS system of FIGS. 4a and 4b has four light beams for each input optical channel and four light beams for each output optical channel. Thus, each of the two light source devices 12 outputs four light beams through a single input optical channel to the rotating polygon deflector 22. Two of the four light beams output from each of the laser source devices 12 have either a different wavelength or a different polarization from the other two light beams. Thus, each of the optical separators 64 pass two of the four light beams and reflect two of the four light beams, so that two of the light beams are directed to each of the image receiving locations 32, 34, 36 and 38. The ROS system of FIGS. 4a and 4b, by directing two light beams to each of the image receiving locations 32, 34, 36 and 38 has a higher throughput than the ROS scanning system shown in FIGS. 3a and 3b. Alternatively, an increased number of light beams could be directed to each of the image receiving locations 32, 34, 36 and 38. Like the embodiments shown in the previous figures, the ROS system shown in FIGS. 4a and 4b utilizes a plurality of input optical channels to direct light beams to separate facets of a single rotating polygon to produce a four color image with one pass of a recording medium past the image receiving locations 32, 34, 36 and 38.

The ROS system of FIGS. 4a and 4b directs two (or more) beams to each of the image receiving locations 32, 34, 36 and 38. The beams directed to each of the image receiving locations 32, 34, 36 and 38 are sagitally separated and are either in pitch with each other or, alternatively, may be interlaced, as described in U.S. Pat. No. 5,233,367 to Curry, the disclosure of which has previously been incorporated by reference.

Figure 5A:
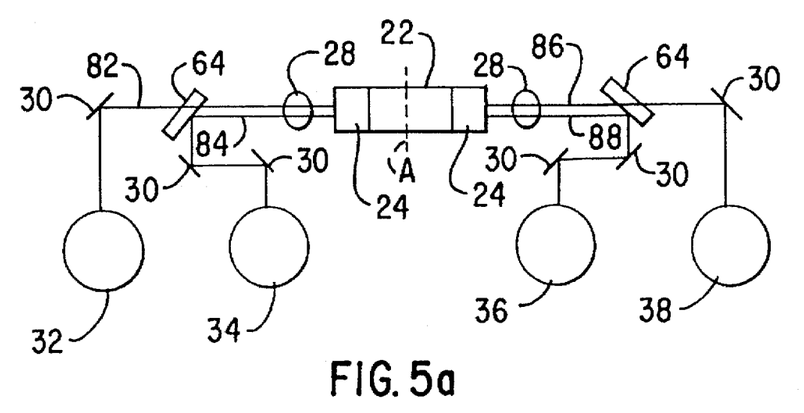
FIG. 5a is a simplified, schematic view of a raster output scanning system that is usable with embodiments of the present invention.
Figure 5B:
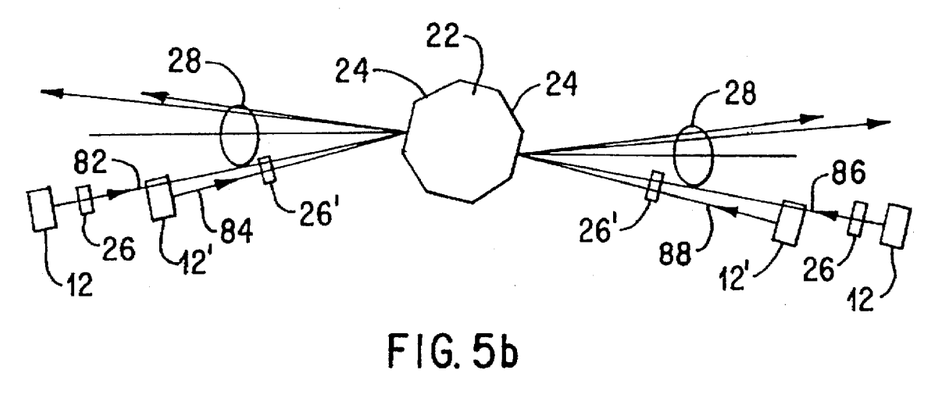

The embodiment illustrated in FIGS. 5a and 5b is similar to the embodiment illustrated in FIGS. 3a and 3b, except that the embodiment illustrated in FIG. 5a and 5b includes four light source devices 12 and 12' and four input optical channels which include four light beams 82, 84, 86 and 88. The light beams 82, 84, 86 and 88 are directed through input optics 26 or 26' to the rotating polygon 22, with two of the four light beams 82, 84, 86 and 88 hitting separate facets of the rotating polygon 22. As shown in FIG. 5a, this embodiment includes two output optical channels each directing two light beams to the optical separators 64.

While the light beams 82, 84, 86 and 88 appear in FIG. 5a to be sagittally separated, the light beams in actuality are only tangentially separated, as shown in FIG. 5b, and are illustrated this way in FIG. 5a for illustration purposes only. In actuality, the light beams 82 and 84 between the rotating polygon and each of the optical separators 64 would appear from the side view of FIG. 5a as a single light beam because the beams from this angle overlap one another when tangentially separated without sagittal separation. Similar to the embodiments shown in the previous figures, the ROS system shown in FIGS. 5a and 5b utilizes a plurality of input optical channels to direct light beams to separate facets of a single rotating polygon to produce a four color image with one pass of a recording medium past the image receiving locations 32, 34, 36 and 38.

Figure 6A:
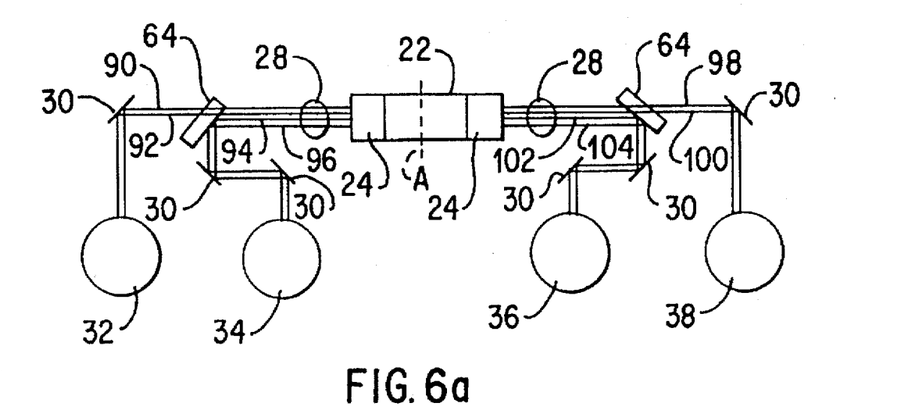
FIG. 6a is a simplified, schematic view of a raster output scanning system that is usable with embodiments of the present invention.
Figure 6B:
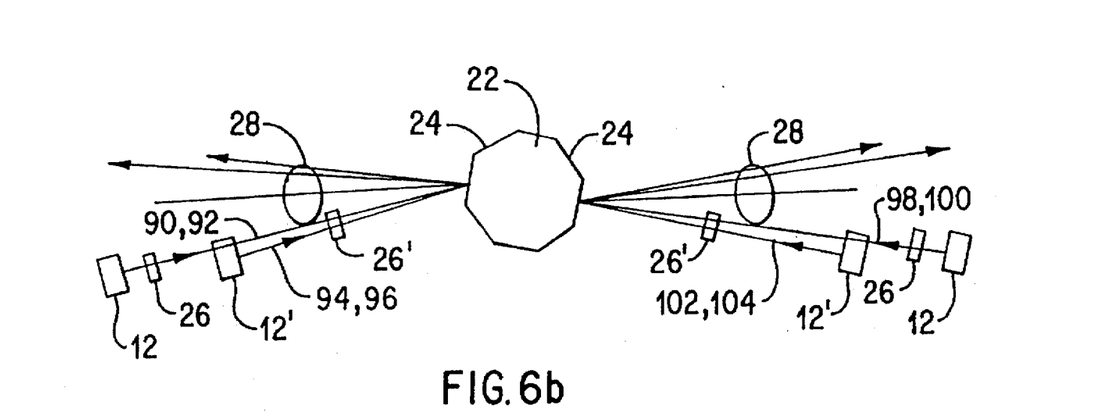

The embodiment shown in FIGS. 6a and 6b is similar to the embodiment shown in FIGS. 5a and 5b except that each of the light source devices 12 and 12' output two of eight light beams 90, 92, 94, 96, 98, 100, 102, and 104. The light beams 90 and 92 are separated from the light beams 94 and 96 in the tangential direction only (they share a common sagittal plane). Likewise, the light beams 98, 100, 102 and 104 are also separated tangentially (they share a common sagittal plane). While the light beams 90, 92, 94, 96, 98, 100, 102 and 104 appear in FIG. 6a to be separated sagittally, they appear this way for illustration purposes only and are actually only separated tangentially. Thus, when viewing the ROS scanning system from the side view of FIG. 6a, the light beams 90, 92, 94 and 96 and the light beams 98, 100, 102 and 104 between the rotating polygon 22 in each of the optical separator 64 would in actuality appear as a single beam because the beams are only tangentially separated.

In the embodiment shown in FIGS. 6a and 6b, the light beams 90 and 92 have either a different wavelength or a different polarization from the light beams 94 and 96. Likewise, the light beams 98 and 100 have either a different wavelength or a different polarization from the light beams 102 and 104. This is necessary so that each of the optical separators 64 may separate by passing or reflecting two of the light beams 90, 92, 94, and 96, and two of the light beams 98, 100, 102 and 104 to each of the image receiving locations 32, 34, 36 and 38.

The ROS scanning system illustrated in FIGS. 6a and 6b, due to the fact that it directs two light beams to each of the image receiving locations 32, 34, 36 and 38, has a higher throughput than the ROS system illustrated in FIGS. 5a and 5b. The ROS system illustrated in FIGS. 6a and 6b may be modified so as to direct more than two light beams to each of the image receiving locations 32, 34, 36 and 38, for an even greater throughput.

Like the previously described embodiments, the embodiment illustrated in FIGS. 6a and 6b utilizes a plurality of input optical channels to direct light beams to separate facets of a single rotating polygon to produce a four color image with a single pass of a imaging medium past the image receiving locations 32, 34, 36 and 38.

The ROS system of FIGS. 6a and 6b directs two (or more) beams to each of the image receiving locations 32, 34, 36 and 38. The beams directed to each of the image receiving locations 32, 34, 36 and 38 are sagitally separated and are either in pitch with each other or, alternatively, may be interlaced, as described in U.S. Pat. No. 5,233,367 to Curry, the disclosure of which has previously been incorporated by reference.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention.

What is claimed is:

1. A raster output scanning system for a printing device, comprising:
   a polygon having a plurality of facets;
   a plurality of input optical channels, a first one of the input optical channels directing a first one of a plurality of light beams onto a first facet of the polygon, and a second one of the input optical channels directing a second one of the plurality of light beams onto a second facet of the polygon, the polygon deflecting one of the light beams onto each of a plurality of disparate optical paths; and
   an optical system located on the disparate optical paths, the optical system directing at least one of the light beams onto each of first, second, third and fourth image receiving locations.

2. The raster output scanning system according to claim 1, wherein the first, second, third and fourth image receiving locations are on first, second, third and fourth photoreceptors, respectively.

3. The raster output scanning system according to claim 1, wherein each of the input optical channels includes:
   one of the plurality of light beams; and
   an optical element directing the plurality of light beams to the polygon.

4. The raster output scanning system according to claim 1, wherein the optical system comprises a plurality of optical output channels, each of the optical output channels including:
   at least one of the light beams; and
   a set of imaging and correction optics through which the light beams pass.

5. The raster output scanning system according to claim 1, wherein each of the plurality of light beams has at least one of a different wavelength and a different polarization from other ones of the plurality of light beams.

6. The raster output scanning system according to claim 5, wherein the optical system includes a plurality of optical separators located along the disparate optical paths between the polygon and each of the plurality of image receiving locations, the optical separators separating the light beams based on one of the wavelength and the polarization of the light beams.

7. The raster output scanning system according to claim 1, wherein the printing device is a four station printer.

8. The raster upward scanning system of claim 1, wherein the optical system directs two of the light beams onto each of the image receiving locations.

9. A raster output scanning system for a four station printing device, comprising:
   a plurality of light sources each emitting at least one of a plurality of light beams;
   a polygon mirror having a plurality of facets;
   a plurality of input optical channels, a first one of the input optical channels directing a first one of the plurality of light beams onto a first facet of the polygon, and a second one of the input optical channels directing a second one of the plurality of light beams onto a second facet of the polygon, the facets of the polygon directing the light beams onto disparate optical paths; and
   optical means for directing at least one of the light beams onto each of first, second, third and fourth image receiving locations.

10. The raster output scanning system according to claim 9, wherein the first, second, third and fourth image receiving locations are on first, second, third and fourth photoreceptors, respectively.

11. The raster output scanning system according to claim 9, wherein each of the input optical channels includes:
    one of a the plurality of light beams; and
    an optical element directing the plurality of light beams to the polygon mirror.

12. The raster output scanning system according to claim 9, wherein the optical means comprises a plurality of optical output channels, each of the output optical channels including a set of imaging and correction optics through which the light beams pass.

13. The raster output scanning system according to claim 12, wherein the plurality of input optical channels comprise four input optical channels and the plurality of output optical channels comprise four output optical channels.

14. The raster output scanning system according to claim 12, wherein the plurality of input optical channels comprise two input optical channels and the plurality of output optical channels comprise two output optical channels.

15. The raster output scanning system according to claim 12, wherein the plurality of input optical channels comprise four input optical channels and the plurality of output optical channels comprise two output optical channels.

16. The raster output scanning system according to claim 9, wherein each of the plurality of light beams has at least one of a different wavelength and a different polarization from other ones of the plurality of light beams.

17. The raster output scanning system according to claim 16, wherein the optical system includes a plurality of optical separators located along the disparate optical paths between the polygon mirror and each of the plurality of image receiving locations, the optical separators separating the light beams based on one of the wavelength and the polarization of the light beams.

18. The raster output scanning system according to claim 9, wherein the optical means directs two of the light beams onto each of the photoreceptors.

19. A method of scanning with a raster output scanning system having a plurality of light beams and a rotating polygon mirror, comprising:
    directing a first one of the plurality of light beams through a first one of a plurality of input optical channels to a first facet of the rotating polygon mirror;
    directing a second one of the plurality of light beams through a second one of the plurality of input optical channels to a second facet of the rotating polygon mirror;
    simultaneously deflecting at least one of the light beams onto each of first, second, third and fourth image receiving locations.

20. The method of claim 19, wherein the step of simultaneously deflecting at least one of the light beams onto each of first, second, third and fourth image receiving locations comprises the step of simultaneously deflecting each of the plurality of light beams onto each of first, second, third and fourth photoreceptors, respectively.

21. The method of claim 19, wherein the step of simultaneously deflecting at least one of the light beams onto each of first, second, third and fourth image receiving locations comprises the step of directing at least one of the light beams though each of a plurality of output optical channels.

22. The method of claim 21, wherein the step of directing at least one of the light beams though each of a plurality of output optical channels comprises directing at least one of the plurality of light beams through one of a plurality of sets of imaging and correction optics.

23. The method of claim 19, further comprising the step of emitting the plurality of light beams from a plurality of light sources.

24. The method of claim 23, wherein the step of emitting the plurality of light beams comprises emitting a plurality of light beams, each of the light beams having one of a different wavelength and a different polarization from other ones of the plurality of light beams.

25. The method of claim 19, further comprising the step of optically separating the light beams based on one of the wavelength and the polarization of the light beams.

26. The method of claim 19, wherein the step of simultaneously deflecting at least one of the light beams onto each of first, second, third and fourth image receiving locations comprises simultaneously deflecting two of the light beams onto each of the image receiving locations.

\* \* \* \* \*